UNITED STATES PATENT OFFICE.

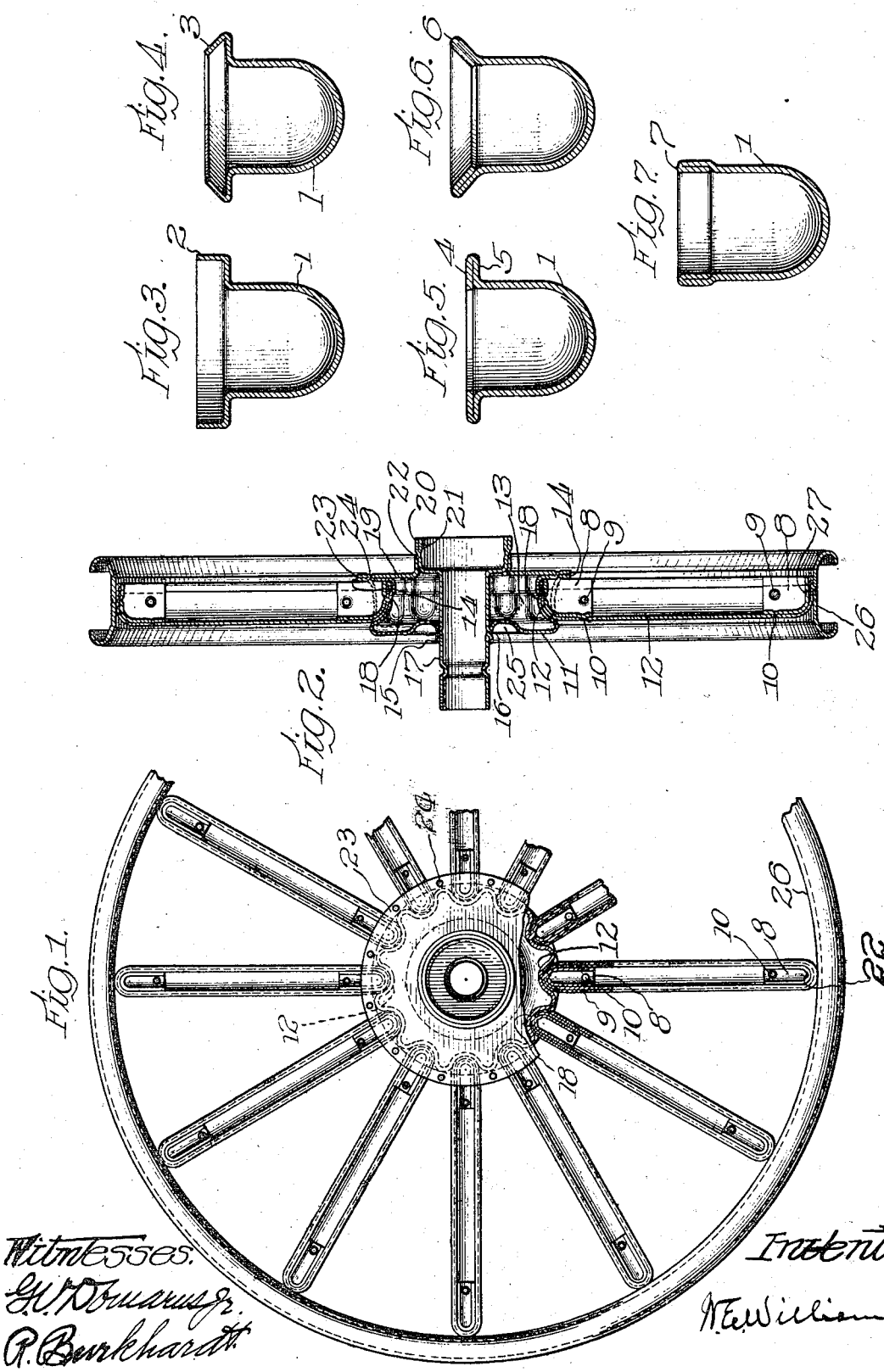

WILLIAM ERASTUS WILLIAMS, OF CHICAGO, ILLINOIS.

PRESSED-STEEL WHEEL.

1,279,198.

Specification of Letters Patent. Patented Sept. 17, 1918.

Application filed December 15, 1914, Serial No. 877,426. Renewed February 20, 1918. Serial No. 218,372.

*To all whom it may concern:*

Be it known that I, WILLIAM ERASTUS WILLIAMS, a citizen of the United States, residing at Chicago, in the county of Cook and the State of Illinois, have invented a new and useful Improvement in Pressed-Steel Wheels, of which the following is a specification.

The object of my invention is to make a spoked wheel having spokes made out of pressed steel that will look substantially like a wooden spoked wheel and yet can be made very strong and cheaply and of about the same weight as the wooden wheels.

Reference will be had to the accompanying drawings in which Figure 1 is a rear elevation of a wheel having parts broken away and parts in section.

Fig. 2 represents a diametrical section of the wheel.

Figs. 3, 4, 5, 6, 7 are cross sections showing a spoke at successive steps or stages of its formation.

In the manufacture of my wheel, I blank out at the first operation what might be likened unto a bath tub shaped pressing, the length of a spoke, having rounded ends and a cross section shown in Fig. 3. 1 indicates the body of the spoke and 2 the flange at the edges of the pressing.

By successive pressing operations the flange 2 is bent as shown at 3, 4, 5, 6, 7, the latter being a cross section at some distance from either end of the completed spoke, the entire marginal portion of which is of doubled thickness, as shown.

The next step consists in making reinforcing thimbles to fit into each end of the open sides of the spokes, formed as heretofore described. These thimbles are indicated by 8 and are of heavier metal than the sheet out of which the spokes are made and they are open at one end and at the side. These thimbles are welded to the spokes by spot welds 9 on the sides of the U section of the spokes and at 10 on the rounded or front face of the spokes, access for welding being had through the open sides of the parts.

The next step in forming my wheel is to make the hub pressing 11 which is made out of pressed steel by suitable dies and is formed with pockets 12 in the horizontal flange 13. Back of these pockets there is a vertical flange 14 and at the hub there is the horizontal flange 15. The flange 15 is welded by spot welds 16 to a pressed steel tubular hub 17.

After the hub piece 11 is suitably formed with the pockets 12 for receiving the ends of the spokes I then weld in the spokes by welds 18 welding the ends of the spokes the thimbles 8 and the pockets 12 of the hub piece 11 all together over a suitable area. The hub pressing 11 and thimbles 8 being of thicker metal than that out of which the spokes are made facilitates the welding and when it is properly done the fastening is much stronger at the hub joint than is the body of the spoke.

After the spokes are welded to the hub piece 11 as described, I then press on a flanged piece 19 having the flange 20 embracing the flanged end 21 of the hub 17 and I then weld the two flanges 20 and 21 by spot welds 22 and I then weld the flange 23 of the piece 19 by the spot welds 24 to the flange 14 of the hub piece 11.

The ends of the spokes fit snugly into their pockets 12 in the hub piece 11 bearing tightly back against the flange 14 and in this construction, the reinforcing thimbles 8 on the inside of the spokes distribute the strain over the entire body of the spoke section preventing a concentration of load on any small area that might indent the metal of the spokes.

The reëntrant curve 25 of the hub piece 11 permits the fastening of the piece 11 to the hub 17 by a suitable flange which is shown as projecting beyond the plane of the body of the piece 11, but obviously the width is not invariable.

After the spider has been formed by fastening the hub pieces and spokes together as above indicated, the spider is then pressed into the rim 26 made in any suitable manner and here shown as the ordinary automobile wheel, clencher type. When the parts are in proper position the ends of the spokes are spot welded through the rim as is indicated by the welds 27 thus completing the wheel.

The rim 26 is here shown as having a flat surface for the inside whereto the ends of the spokes are welded, but this form of surface is not necessarily employed.

This method of making a wheel gives a wheel a spoked appearance from the outside and as the spokes are made of the thinnest metal used in a wheel, it is desirable that there should be no inclosed space that may not be protected from corrosion lest the strength of the wheel be seriously diminished by corrosion before the normal life of the wheel is exhausted.

With my open back spokes, access for washing and painting may be had to the interior surfaces where thin metal is used and the metal be protected from corrosion.

The flanged edge of my U-shaped or bath tub shaped spokes reinforced as is indicated gives a moment of resistance to the open side of the spoke approximately equal to the resistance of the front or rounded face and thus I secure a spoke open at the back having substantially the same strength as a tubular spoke might have.

Spot welding is done very quickly and my spokes may be welded into the hub in the manner indicated and save in the cost of manufacture.

What I claim is:

1. The combination with a hub having suitable peripheral spoke-receiving recesses, of spokes U-shaped in transverse and axial sections and with ends fitting in said recesses, respectively, and a rim encircling the spokes and rigidly fixed to the outer end of each.

2. The combination with a suitable hub, of trough-like spokes having continuous marginal walls and terminally fixed to the periphery of the hub, and a suitable rim encircling the spokes and rigidly fixed to the end wall of each.

3. The combination with a hub with peripheral spoke-receiving recesses, of spokes having the form of open troughs with rounded ends and with marginal walls continuous around said ends, metal reinforcing members fitting in each end portion of each trough, and a rim encircling the free ends of all the spokes, said hub, spokes, reinforcing members and rim being rigidly secured together at the rounded ends of the spokes.

4. The combination with a hub and rim of metal, of trough-like spokes having continuous marginal walls doubled back upon themselves at all points to give double marginal thickness and all terminally fixed to both hub and rim.

5. The combination with a pliable metal hub of circular cross section having its wall pressed inward at intervals to form spoke-receiving indentations, of a series of pressed steel spokes U-shaped in cross section and having rounded end faces fitting and rigidly fixed in said indentations, respectively, and a rim fixed to the outer ends of the spokes.

6. The combination with a hub having a series of peripheral indentations, of a corresponding series of trough-like spokes having continuous lateral and terminal marginal walls of substantially uniform width, relatively short, like shaped reinforcing members fitting in the inner end portions of the spokes, respectively, and a rim fixed to the outer ends of the spokes, said hub, spokes and reinforcing members being rigidly secured together in the axial lines of the spokes, respectively.

7. A wheel composed of spokes having U-shaped cross sections and with closed ends, reinforcing thimbles at the ends of the spokes, said thimbles fastened to the body of the spoke and the said spokes fastened both at the rim and to the hub by fastening means extending in a line lengthwise of the spoke.

8. A wheel having a hub tube and a concentric shell of greater diameter mounted on the middle portion of the tube and having its peripheral wall bent inward at intervals to form radial spoke-receiving pockets, a series of spokes abutting and rigidly fixed to the bottoms of the pockets, respectively, and a rim fixed to the outer ends of the spokes.

9. A wheel having a hub body portion provided with pockets adapted to receive the end of the spokes in a direction endwise of the spokes, spokes of substantially U-shaped cross section and with closed ends, reinforcing thimbles secured to each end of the spokes and a rim extending over the outer ends of the spokes, each spoke, its thimbles, the rim, and the hub being rigidly united in the line of the spoke's axis.

10. The combination with a pressed metal hub of substantially uniform thickness and circular cross section, of trough-like terminally closed spokes having end faces which meet the hub at all points of said faces and are welded thereto over a suitable area of the contact surfaces.

11. A spoke of ductile metal having the form of a trough with closed ends and having each end portion provided with a similarly formed reinforcing member closely fitting in the trough and rigidly connected to both the body and the terminal wall of the spoke.

Signed in Chicago, in the State of Illinois, and county of Cook this 25th day of November, 1914.

WILLIAM ERASTUS WILLIAMS.

Witnesses:
H. A. FORSBERG,
EUGENE S. COOPER.